(12) United States Patent
Erickson et al.

(10) Patent No.: US 6,270,293 B2
(45) Date of Patent: *Aug. 7, 2001

(54) TOOLHOLDER ASSEMBLY

(75) Inventors: Robert A. Erickson, Raleigh, NC (US); William M. Long, Blairsville, PA (US)

(73) Assignee: Kennametal PC Inc., Monrovia, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/219,328

(22) Filed: Dec. 22, 1998

(51) Int. Cl.⁷ .................................................. B23B 29/00
(52) U.S. Cl. ........................... 407/101; 407/108; 82/158; 82/160
(58) Field of Search ..................... 82/160, 158; 407/101, 407/66, 72, 108; 408/238, 239 R, 239 A (56) References Cited

U.S. PATENT DOCUMENTS

| 2,485,799 | 10/1949 | Wotych | 279/76 |
|---|---|---|---|
| 2,667,687 | 2/1954 | Clarkson | 29/103 |
| 4,708,040 | 11/1987 | Erickson | 82/36 B |
| 4,715,753 | 12/1987 | Tack | 409/234 |
| 4,726,268 | 2/1988 | Erickson . | |
| 4,736,659 | 4/1988 | Erickson | 82/36 |
| 4,813,831 | * 3/1989 | Reinauer | 82/160 X |
| 4,913,607 | 4/1990 | von Haas | 409/234 |
| 4,981,057 | * 1/1991 | Von Haas et al. | 407/101 X |
| 5,040,931 | * 8/1991 | Spivey et al. | 82/158 X |
| 5,040,932 | 8/1991 | Oshnock | 409/234 |
| 5,341,710 | 8/1994 | Peuterbaugh | 409/234 |
| 5,417,131 | * 5/1995 | Robertson | 82/160 X |
| 5,873,682 | * 2/1999 | Tripsa | 82/160 X |

FOREIGN PATENT DOCUMENTS 2099904    12/1982   (GB) .

OTHER PUBLICATIONS

Copy of International Search Report, mailed Feb. 28, 2000, in Application No. PCT/US99/29326.

* cited by examiner

Primary Examiner—Henry Tsai
(74) Attorney, Agent, or Firm—Larry R. Meenan (57) ABSTRACT

An apparatus is disclosed for releasable holding a toolholder shank having a lockable surface and a releasable surface utilizing an actuating bolt. The actuating bolt is reciprocally movable along an axis to engage one side of the shank for locking the toolholder within the support member and an opposing side of the shank for releasing the toolholder from the tool support member.

45 Claims, 9 Drawing Sheets

TOOLHOLDER ASSEMBLY

FIELD OF THE INVENTION

The invention is directed to tooling for machining operations and, more specifically, directed to a toolholder and an apparatus for holding the toolholder secure within a tool support member during machining operations.

BACKGROUND OF THE INVENTION

During machining operations performed upon a workpiece, minimizing the down time of a machine tool in a production environment is critical to the success of a manufacturing facility. Historically, one major contributor to such down time was the time needed to change damaged or worn out cutting tools used by the machine tool. A cutting tool is held by a toolholder, which is typically mounted within a spindle or tool support member. When the cutting tool must be replaced, the entire toolholder with the cutting tool, is removed from the spindle. A number of commercial couplings permit quick connecting and disconnecting of the toolholder to and from the spindle to expedite the tool changing process. One such device is the "Apparatus for Holding a Toolholder Shank" described in the U.S. Pat. No. 4,736,659 which is co-owned by the Assignee of the present application and which is hereby incorporated by reference. The apparatus described in that patent utilizes two locking balls which are urged radially outwardly within a tool support member to engage apertures on the shank of a toolholder. While this arrangement is efficient and permits the toolholder to be removed or secured to a tool support member in a short amount of time, the design of this arrangement may limit its application to toolholders having a width of one inch or greater. Since many industrial applications require the use of a cutting tool which must be mounted on a much smaller toolholder, a need exists for a quick change toolholder system for toolholder having a width of less than one inch.

Such a system must not only have a compact design, but furthermore provide quick connecting and disconnecting of the toolholder from the toolholder support member in an efficient manner that makes it practical for use by a machine tool operator.

The system described hereinafter is a quick change tooling system by which a toolholder is secured within a tool support member utilizing simple hardware that permits the size of the toolholder and toolholder support member to be significantly reduced over other commercially available quick change tool systems.

SUMMARY OF THE INVENTION

The subject invention is directed to an apparatus for releasable holding a toolholder shank having a lockable surface and a releasable surface. The apparatus comprises a tool support member having a forwardly facing surface and a bore along a longitudinal axis. The bore intersects the forwardly facing surface and extends rearwardly from there for receiving the toolholder shank. The apparatus is also comprised of an actuating bolt positioned within the tool support member and reciprocally movable between a locking and a releasing position along a radial axis relative to the longitudinal axis for locking or ejecting the toolholder shank into or from the tool support member. The actuating bolt has a locking segment for abutting and urging rearwardly the locking surface of the shank to lock the toolholder within the tool support member.

The toolholder may be mounted in a bore of the tool support member having a longitudinal axis, a forwardly facing surface which is secured within the bore by an actuating bolt movable in a reciprocating motion along a radial axis. The bolt has a releasing segment and a locking segment.

The subject invention is also directed to a toolholder which is comprised of a forward end upon which a cutting tool is mounted, a shank adjacent to and connected to a rearwardly facing abutment face and extending rearwardly away from the forward end. The shank is perforated by a lockable perforation and a releasable perforation at two circumferentially spaced locations. The lockable perforation has a lockable surface which is urged rearwardly by the locking segment of the actuating bolt when the actuating bolt is moved in a radial direction. The releasable perforation has a releasable surface which is urged forwardly by the releasing surface of the actuating bolt when the actuating bolt is moved in an opposite radial direction. The shank has one slot in a region rearwardly of each of perforations extending to the end of the shank to permit access by the actuating rod to each of the perforations.

The subject invention is also directed to a combination for mounting a toolholder into a bore within a forwardly facing surface of a tool support member. The combination comprises a shank on a rearward portion of the toolholder extending rearwardly into the bore of the tool support member. The shank is perforated by a lockable perforation and a releasable perforation at two circumferentially spaced locations. A lockable surface in the lockable perforation may be engaged by the locking segment of the actuating bolt to lock the shank within the toolholder. A releasable surface in the releasable perforation may be engaged by the releasing surface of the actuating bolt to eject the shank from the toolholder. The actuating bolt has a locking segment and a releasing segment wherein the actuating bolt is reciprocable between a locked position in which the locking segment of the actuating bolt engages the lockable surface of the shank lockable perforation and a released position in which the releasing segment of the actuating bolt engages the releasable surface of the shank releasable perforation.

BRIEF DESCRIPTION OF THE DRAWINGS

The above, as well as other features and advantages of the invention, will become apparent to consideration of the detailed description in connection with the several drawings in which.

DESCRIPTION OF THE PREFERRED EMBODIMENT

Figure 1:
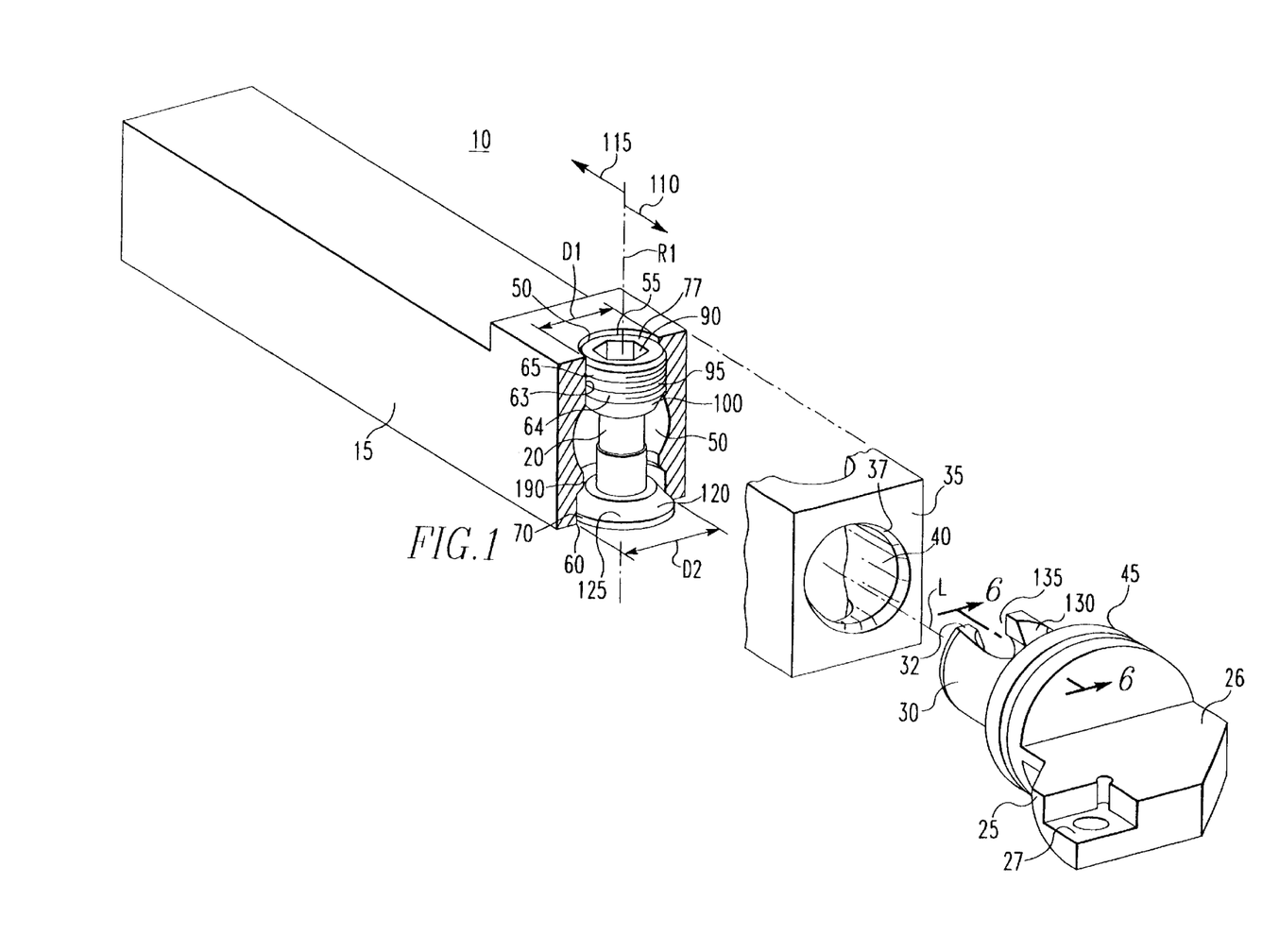
FIG. 1 is an exploded, perspective view of the toolholder assembly in accordance with the present invention.
Figure 2:
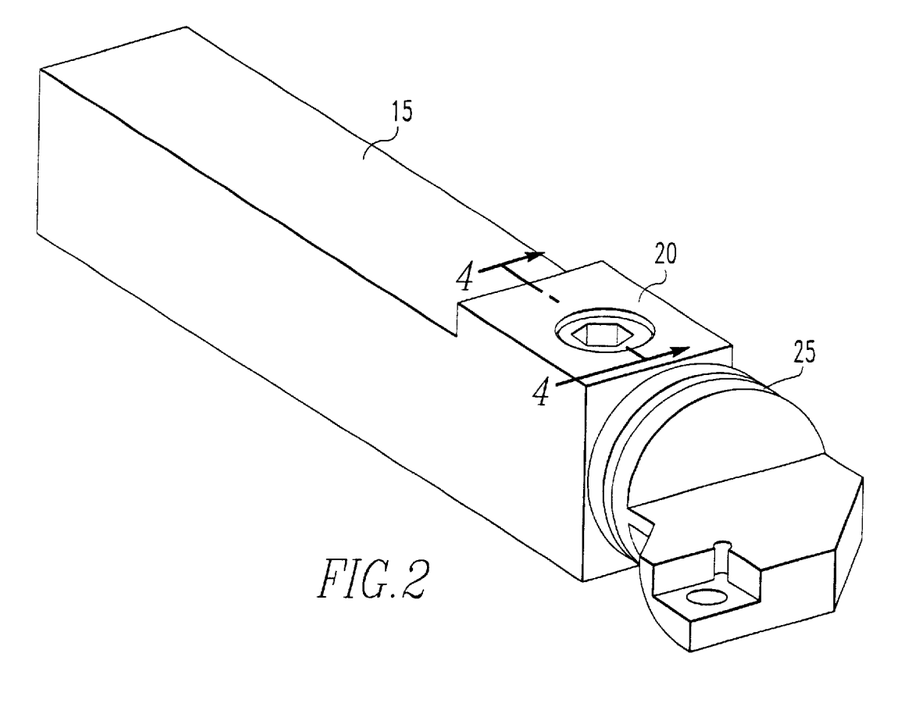
FIG. 2 is an assembled perspective view of the toolholder assembly in accordance with the present invention.

FIGS. 1 and 2 illustrate perspective views of the subject invention in an exploded arrangement and an assembled arrangement, respectively. In general the apparatus 10 is made up of a tool support member 15, an actuating bolt 20 and a toolholder 25 having a shank 30, which may be tubular with a cylindrical shape. However, the subject invention is directed at securing the shank 30 within the tool support member 15 and therefore, the shank 30 and the bore 40 may have any number of different shapes (including square, rectangular, triangular and trochoidal) sufficient to accommodate the actuating bolt 20 described herein. The toolholder 25 may have a support portion 26 with a pocket 27 for receiving a cutting insert (not shown) therein. However, the toolholder 25 is presented for illustrative purposes only and, as will be discussed, the shank 30 of the subject invention may be used with any of a variety of configurations attached to the shank 30. Therefore, the term toolholder used herein should encompass any configuration secured to the tool support member 15 through the shank 30.

The tool support member 15 has a forwardly facing surface 35 and a bore 40 along a longitudinal axis L. The surface 35 may be mateable with a opposing rearward abutment surface 45 on the toolholder 25 and the surfaces may be, among other shapes, conical or planar to matingly contact one another. The bore 40 extends rearwardly from the forwardly facing surface 35 for receiving the tubular toolholder shank 30 of the toolholder 25.

The actuating bolt 20 is positioned within the tool support member 15 along a radial axis R1, relative to the longitudinal axis L, for locking the tubular toolholder shank 30 into the tool support member 15 or for ejecting the tubular toolholder shank 30 from the tool support member 15. The actuating bolt 20 is positioned within a passageway 50, which extends through the tool support member 15 along the radial axis R1, thereby defining a first aperture 55 and a second aperture 60 within the tool support member 15 wherein the second aperture 60 is diametrically opposed to the first aperture 55.

The actuating bolt 20 is reciprocally movable between a locking position and a releasing position along the radial axis R1. As will be explained, in one position, the actuating bolt 20 secures the tubular shank 30 within the tool support member 15 and, in a second position, the actuating bolt 20 ejects the tubular shank 30 from the tool support member 15.

While other designs are available for reciprocally moving the actuating bolt 20 along the radial axis R1, in the arrangement illustrated in FIG. 1, the first aperture 55 has a first aperture diameter D1 with threads 63 which matingly engage with threads 64 on the outside of a locking flange 65 of the actuating bolt 20. The locking flange 65 has the same diameter D1. In this manner, the actuating bolt 20 is reciprocally movable along the radial axis R1 by rotation of the actuating bolt 20 in the appropriate direction. The second aperture 60 has a second aperture diameter D2 which accepts the releasing flange 70 on the actuating bolt 20 such that the first aperture 55 and the second aperture 60 act to provide support to the actuating bolt 20 within the tool support member 15. Furthermore, as illustrated in FIG. 1, a portion of the shank 30 may be removed to provide a top surface 32 on the shank 30. This lowers the profile of the shank 30 allowing the locking flange 65 to move further down within the passageway 50 when the shank 30 is in the bore 40. Advantageously, this allows both the locking flange 65 and the first aperture 55 to have a greater depth, which in turn permits a greater number of active threads 63, 64 between the locking flange 65 and the first aperture 55 while maintaining the same thread pitch. With a greater number of active threads 63,64, the actuating bolt 20 can better tolerate higher loads along the radial axis R1. The exploded arrangement in FIG. 1 is showed assembled in FIG. 2.

Figure 3:
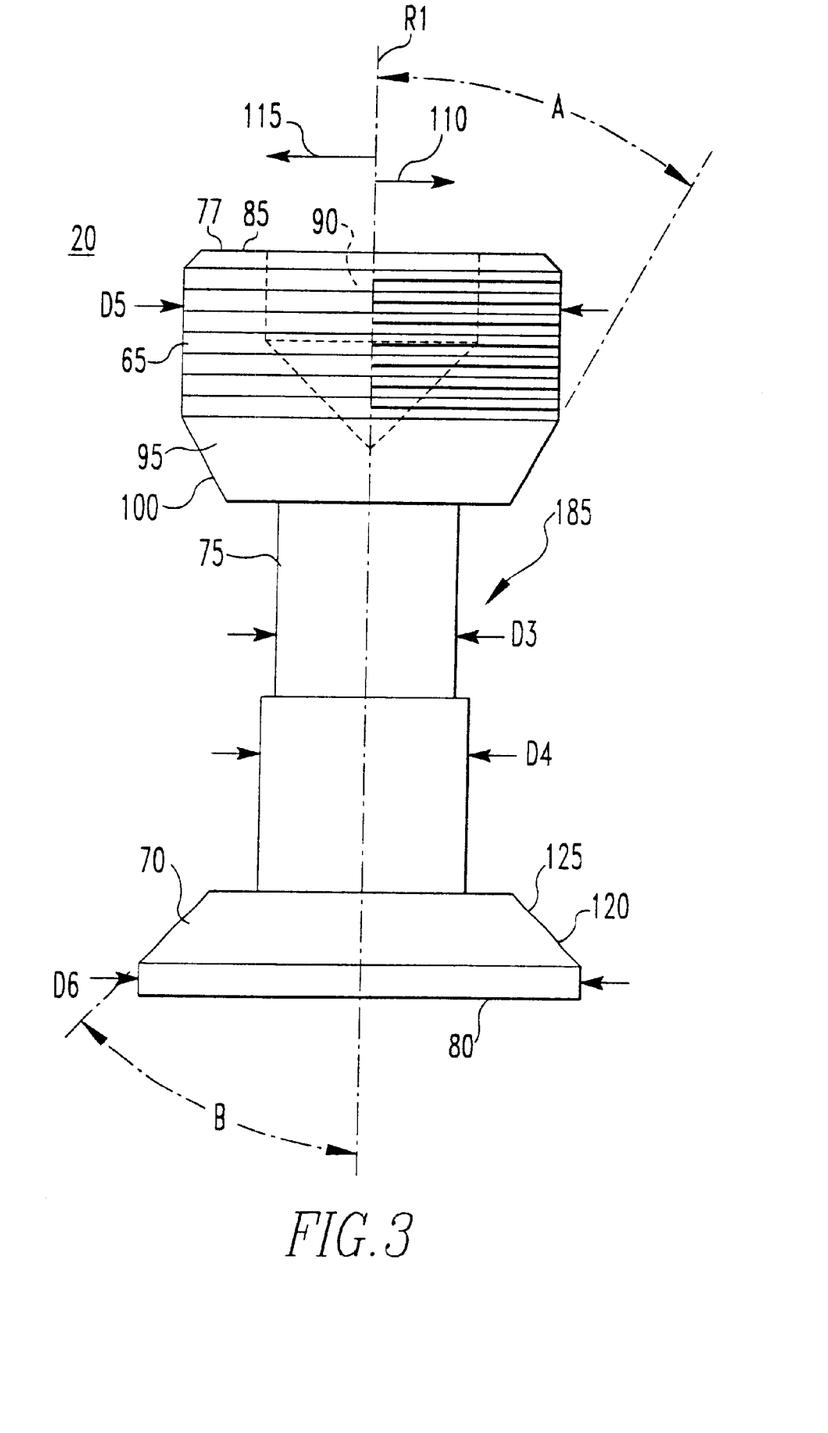
FIG. 3 is a side view of the actuating bolt.

Directing attention to the actuating bolt 20, as illustrated in FIG. 3, the actuating bolt 20 has general appearance of an hour glass and is comprised of a shaft 75 having a first end 77 and a second end 80 which may be separately connected to the shaft 75 or may form one integral piece. An actuating bolt head 85 has extending therein a hexagonal cavity 90 to accept a tool for rotating the actuating bolt 20. In the alternative, any configuration which would accept a tool for rotating the actuating bolt 20 would be acceptable and such configurations are well known to those skilled in the art of designing rotating fasteners.

Of particular interest in the actuating bolt 20 are the locking flange 65 and the releasing flange 70. The locking flange 65 has a locking segment 95 having a wedge surface 100 extending around the perimeter of the actuating bolt 20. For purposes of discussion, the bolt illustrated in FIG. 3 will be referred to as having a bolt forward half 110 and a bolt rearward half 115, as illustrated by arrows in FIGS. 1 and 3. When the actuating bolt 20 is displaced in the downward direction, the wedge surface 100 of the locking segment 95, located on the rearward half 115 of the actuating bolt 20, engages the tubular shank 30 (not shown) and urges it in the rearward direction. On the other hand, the releasing flange 70 at the second end 80 of the actuating bolt 20 has a releasing segment 120 with a wedge surface 125 extending around the periphery of the actuating bolt 20. The wedge surface 125 engages the tubular shank 30 along the forward half 110 of the actuating bolt 20 to urge the tubular shank 30 (not shown) from the tool support member 15.

Figure 4:
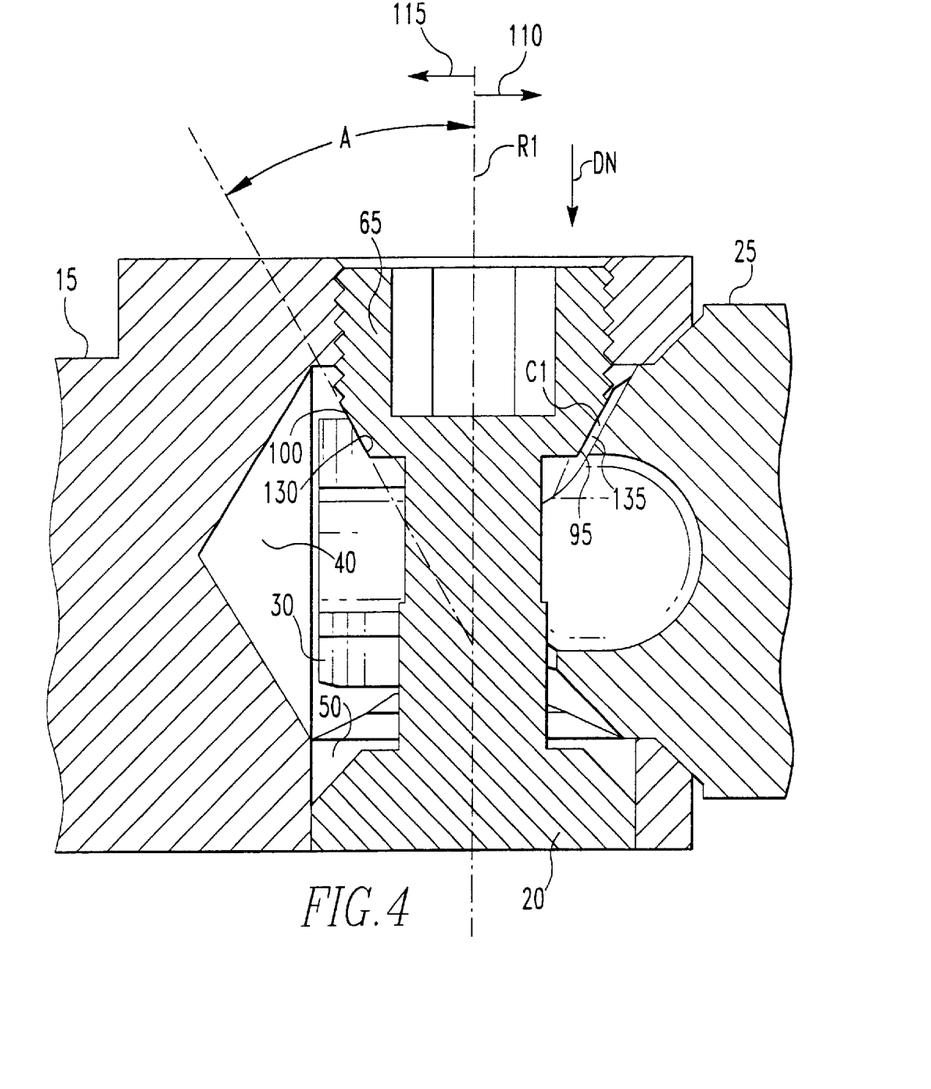
FIG. 4 is a section view along arrows 4—4 in FIG. 2 illustrating the apparatus in the locked position.

FIG. 4 illustrates a cross section of the apparatus along arrows "4—4" in FIG. 2 in the locked condition. The tubular shank 30 of the toolholder 25 is inserted withing the bore 40 of the tool support member 15. The actuating bolt 20 is moved downwardly, as indicated by arrow DN, within the passageway 50 so that the wedge surface 100 contacts a lockable surface 130 around a lockable perforation 135 within the tubular shank 30 of the toolholder 25. As illustrated in FIG. 4, the tubular shank 30, in the region of the wedge surface 100 of the locking segment 95 on the forward half 110 of the actuating bolt 20, is provided with sufficient clearance C1 to avoid contact with the locking segment 95. In this fashion, all of the contact between the shank 30 and the actuating bolt 20 will occur on the rearward half 115 of the actuating bolt 30 thereby providing a pull-back force upon the shank 30 within the bore 40 of the tool support member 15.

Figure 5:
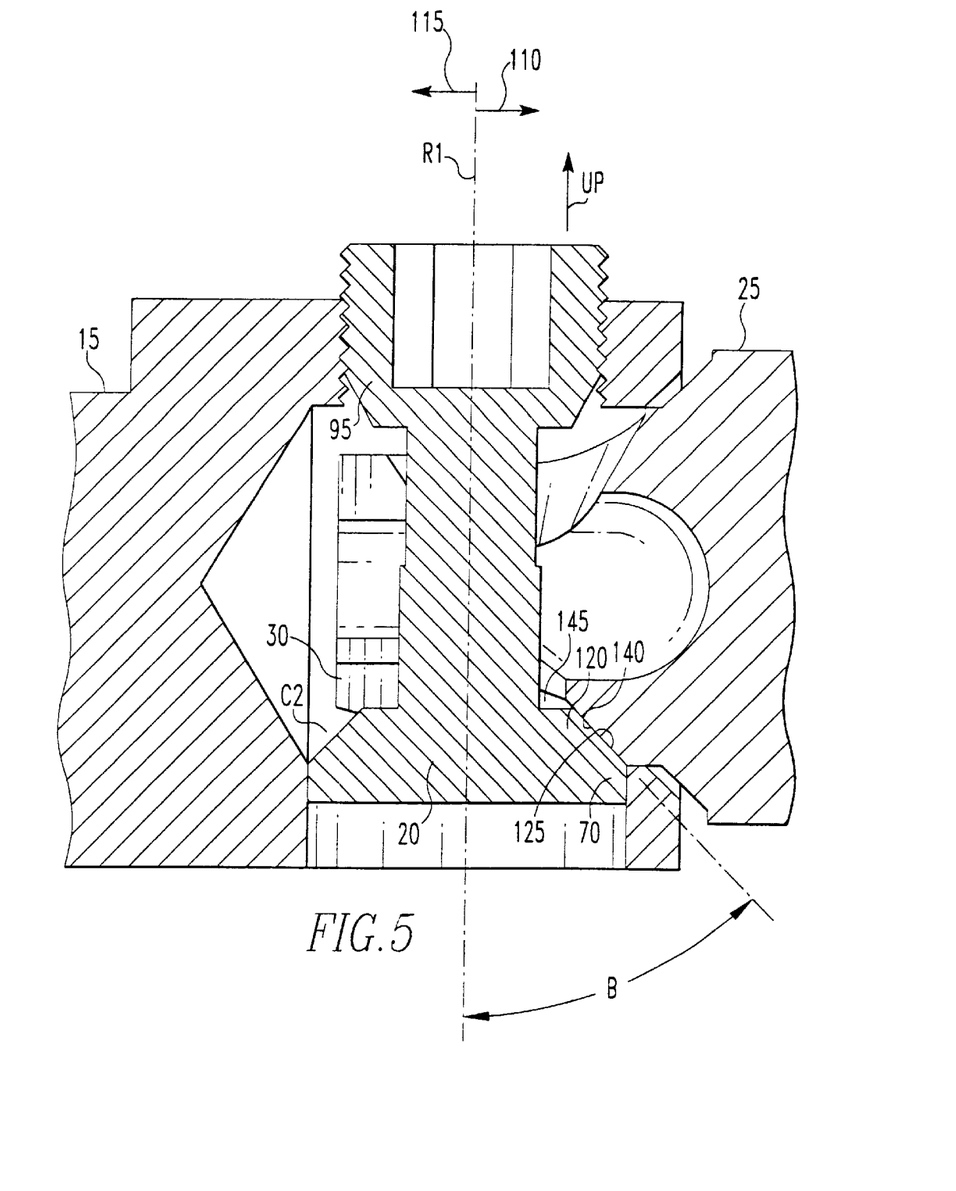
FIG. 5 is a section view similar to that in FIG. 4, however showing the arrangement with the actuating bolt in the raised position to expel the toolholder from the tool support member.

FIG. 5 illustrates a cross section view of the apparatus in the released position whereby the actuating bolt 20 ejects the tubular shank 30 from the tool support member 15. In this instance, the actuating 20 is moved upward, as indicated by arrow UP, and the releasing flange 70 engages the shank 30 to eject the toolholder 25 from the tool support member 15. Specifically, the wedge surface 125 of the releasing segment 120 is moved upwardly against a releasable surface 140 within a releasable perforation 145 of the tubular shank 30. Unlike the locking segment 95, which engages the shank 30 on the rearward half 115 of the actuating bolt 20, the releasing segment 120 engages the releasable surface 140 on the forward half 110 of the actuating bolt 20. By doing so, the forces generated by the actuating bolt 20 will act to eject the tubular shank 30 from the tool support member 15. Sufficient clearance C2 is provided between the shank 30 and the releasing segment 120 on the rearward half 115 of the actuating bolt 20 such that there is no contact between the wedge surface 125 of the releasing segment 120 with the shank 30 on the rearward half 115 of the actuating bolt 20.

In this fashion, when the actuating bolt 20 is moved in a downward direction DN (FIG. 4), the lockable surface 130 of the lockable perforation 135 is engaged to the secure the shank 30 within the tool support member 15. On the other hand, when the actuating bolt 20 is moved in the upward direction UP (FIG. 5), the releasable surface 140 of the releasable perforation 145 is engaged by the wedge surface 125 of the releasing segment 120 on the forward half 110 of the actuating bolt 20 thereby ejecting the shank 30 from the tool support member 15.

Figure 6:
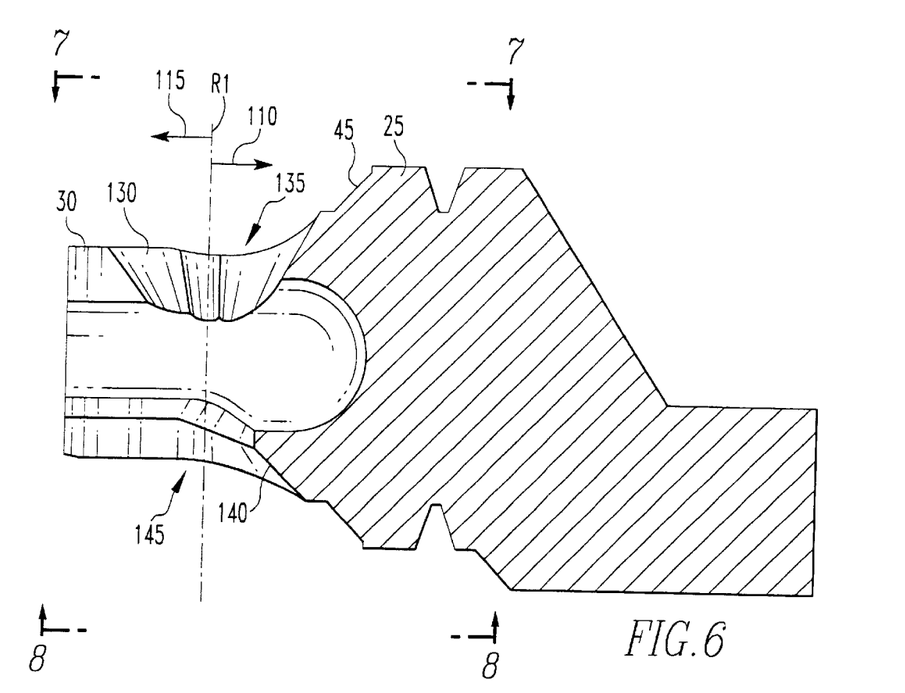
FIG. 6 is a section view of the toolholder shank taken along arrows 6—6 in FIG. 1.

FIG. 6 illustrates a detailed cross section of the shank 30 of the tool holder 25. The lockable perforation 135 and the releasable perforation 145, also illustrated in FIGS. 7 and 8 respectively, extend along the radial axis R1 such that the lockable surface 130, which as illustrated in FIG. 6 may be conical in shape, is positioned on the rearward side 115 of the radial axis R1 and the releasable surface 140 is positioned on the forward side 110 of the radial axis R1. Therefore, the actuator bolt 20 will urge the shank 30 to the left when the lockable surface 130 is engaged and will urge the shank 30 to the right when the releasable surface 140 is engaged.

It should be noted the rearward abutment surface 45 in FIG. 6 defines a conical shape and, in this instance, the forwardly facing surface 35, of FIG. 1, of the tool support member 15 would have a mating conical shape 37 for receiving a toolholder 25 within the tool support member 15.

Figure 7:
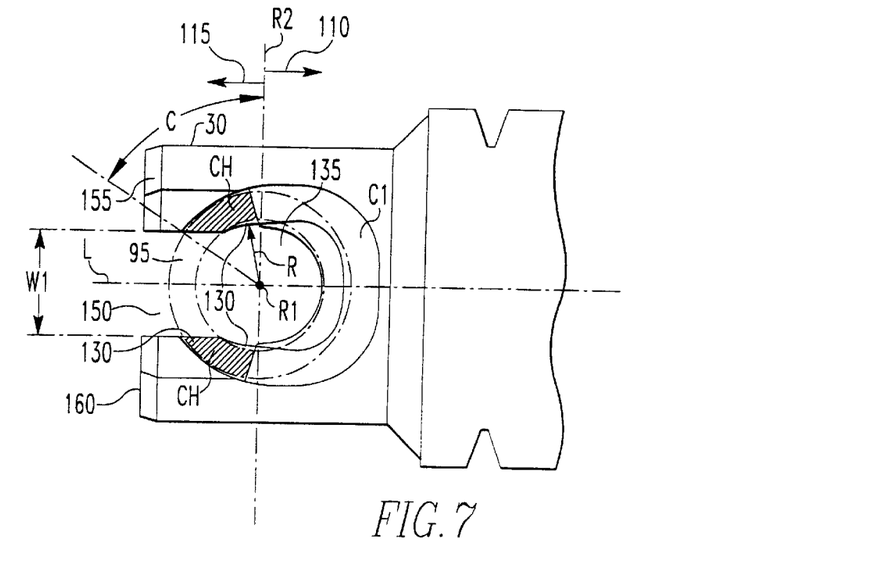
FIG. 7 is a top view of the toolholder shank in FIG. 6 taken along arrows 7—7.

FIG. 7 illustrates a top view of the shank 30 along arrows "7—7" in FIG. 6. For illustrative purposes, the radial axis R1 extends out of the page and is illustrated as a point within the lockable perforation 135. A third axis R2 is perpendicular to the radial axis R1 and to the longitudinal axis L. The locking segment 95 of the actuating bolt 20 is shown in phantom. The locking segment 95 engages the lockable surface 130 of the shank 30, as shown by cross-hatching CH, in FIG. 7. The engaged portion of the lockable surface 130 extends partially around and engages the lockable perforation 135 from a location rearwardly of the radial axis R2 of the actuating bolt 20 to form, with radial axis R2, an angle C of between 5°–80° with a preferred angle between 50°–60°.

A slot 150 extends rearwardly from the lockable perforation 135 and performs two function. First of all, the slot 150 extends completely through the shank 30 and permits the shank 30 to be inserted around the actuating bolt 20 within the tool support member 15. Furthermore, the slot 150 permits side 155 and side 160 of the shank 30 to expand radially outward at the same time the shank 30 is urged in the rearward direction 115 when the locking segment 95 is urged against the lockable surface 130 of the shank 30.

The area of the lockable perforation 135 on the forward half 110 of the radial axis R1 is provided with sufficient clearance to ensure the locking segment 95 will never contact the locking perforation 135 in a forward direction 110 from the radial axis R1. As previously mentioned, clearance area C1 is provided for this.

It should be noted that the centerline of the locking segment 95 is coaxial with the radius R of the lockable surface 130. This permits the locking segment 95, which is conical, to fully engage the lockable surface 130, which is also conical. Such an arrangement will permit relatively high forces between the locking surface 95 and the lockable surface 130 since the generated force will be distributed over the contact area between two surfaces.

Figure 8:
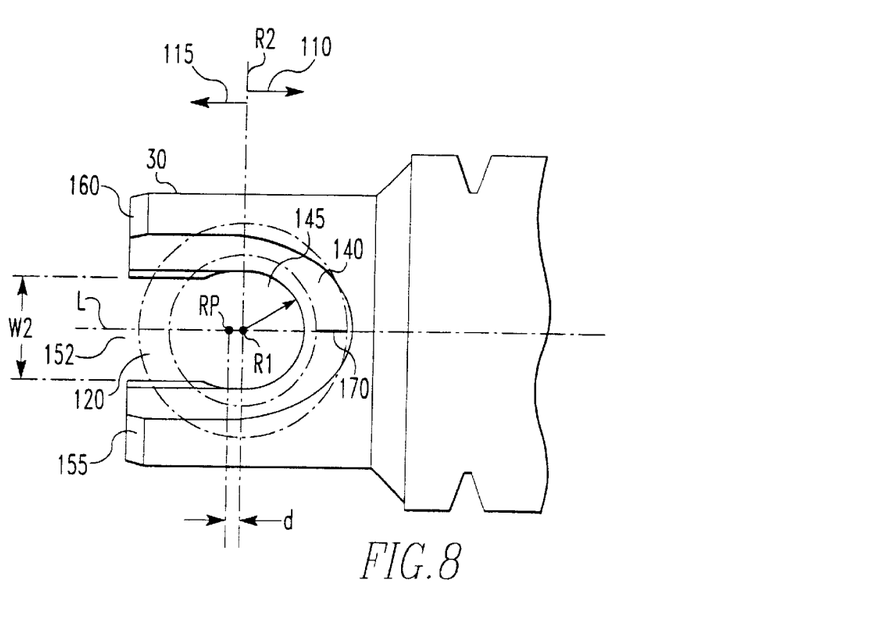
FIG. 8 is a view of the toolholder shank illustrated in FIG. 6 taken along arrows 8—8.

FIG. 8 illustrates a bottom view of the shank 30 along arrows "8—8" in FIG. 6 looking upward into the releasable perforation 145. Just as with FIG. 7, the radial axis R1 has been indicated as a point and a third axis labeled R2 has been extended in a direction perpendicular to the radial axis R1 and to the longitudinal axis L.

The releasing segment 120 of the actuating bolt 20 (not shown) is illustrated in phantom. The releasing segment 120 has a centerline RP which may be coaxial with the radial axis R1. However, as illustrated in FIG. 8, the centerline RP of the releasable perforation 145 is shifted to the left by an amount "d". As a result, the conical surface of the releasing segment 120 contacts the conical releasing surface 140 along a line coincident with the longitudinal axis L, as shown by the heavy contact line 170.

The purpose of this is two-fold. First of all, this prevents engagement of the releasing segment 120 against the sides of the releasable perforation 145 along axis R2. This contact would spread the shank side 155 and shank side 160 radially outward from the slot 152 therebetween and against the bore (not shown) of the toolholder support member. This would tend to retain the shank within the toolholder support member bore and inhibit expelling the shank. Furthermore, by offsetting the releasable surface 140 relative to the releasing segment 120, it is possible to intentionally position the line of contact 170 between these two surfaces directly along the longitudinal axis L. This provides a force directly along the longitudinal axis L to effectively eject the shank 30 from the tool support member 15.

It is possible for the centerline RP of the releasable perforations 145 to be coaxial with the radial axis R1. Under such circumstances, there must be a clearance area on the releasable surface 140 rearward of the radial axis R2. This will allow the actuating bolt 20 to exert a force on the shank 30 in the forward direction 110 in the same fashion the actuating bolt 20 exerts a force on the shank 30 in the rearward direction 115 to secure the shank 30.

Returning to FIGS. 3 and 4, the wedge surface 100 of the locking segment 95 forms an angle A with the radial axis R1. The range of the angle A may be between 10–60° with a preferred angle of 30°. The lockable perforation 135 (FIG. 4) of the shank 30 has a lockable surface 130 which forms the same angle A between the lockable surface 130 and the radial axis R1.

Directing attention to FIGS. 3 and 5, the wedge surface 125 of the releasing segment 120 forms an angle B with the radial axis R1. The angle B may have a range of between 10–60° and a preferred angle of 45°. Additionally, the release surface 140 of the releasable perforation 145 (FIG. 5) forms the same angle B with the radial axis R1.

Returning to FIG. 1, in a preferred embodiment, the wedge surface 100 of the locking segment 95 and the wedge surface 125 of the releasing segment 120 of the actuating bolt 20 are conical in shape. As a result, in the preferred embodiment, the lockable surface 130 (FIGS. 1 and 4) of the lockable perforation 135 on the shank 30 and the releasable surface 140 (FIG. 5) of the releasable perforation 145 are also conical.

Returning to FIG. 3, it should be noted that the shaft 75 of the actuating bolt 20 has a middle section 185 with a first diameter D3 and a second diameter D4. These diameters are not equal and generally correspond to the width W1 (FIG. 7) of slot 150 associated with the lockable perforation 135 and with W2 (FIG. 8) of slot 152 associated with the releasable perforation 145. This provides an error proof arrangement whereby the tubular shank 30 may be inserted around the actuating bolt 20 in only one orientation. The width of one slot is greater than the width of the actuating bolt 20 in one region of the bolt 20 but less than the width of the actuating bolt 20 in another region of the actuating bolt 20 thereby providing an error-proof for inserting the toolholder shank 30 within the bore at a pre-determined orientation.

Additionally, as illustrated in FIG. 3, the width D5 of the locking flange 65 is different than the width D6 of the releasing flange 70. These diameters correspond with matching diameters, D1, D2 respectively (FIG. 1) of the first aperture 55 and the second aperture 60 in the tool support member 15.

Briefly turning attention to FIG. 1, it is possible to limit travel of the actuating bolt 20 in the upward direction by providing the lip 190 extending radially from the wall of the aperture 60. A lip 190 engages the wedge surface 125 of the actuating bolt 20.

Figure 9:
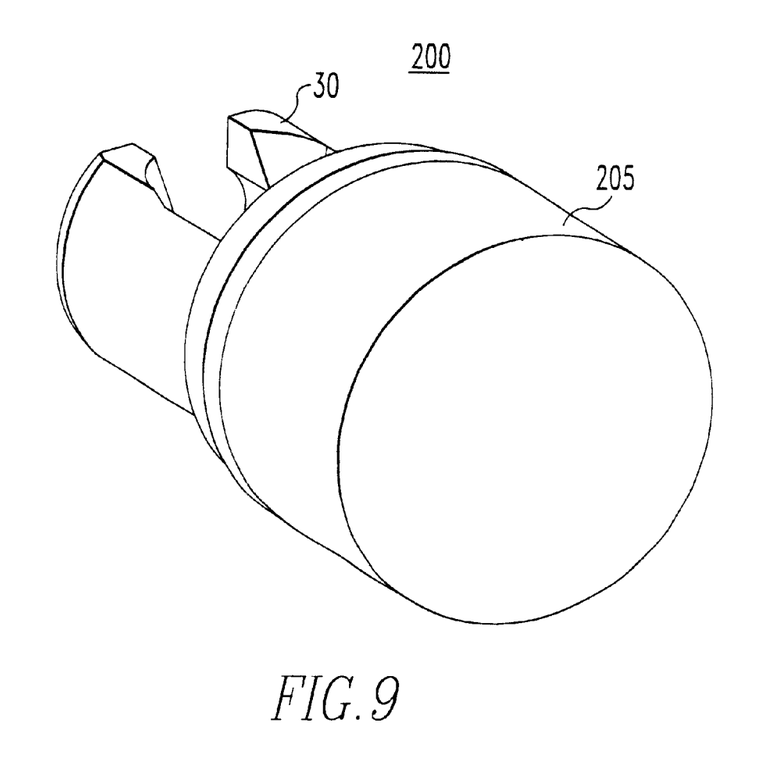
FIG. 9 is a perspective view of a toolholder blank, which has not yet been machined for any particular use.
Figure 10:
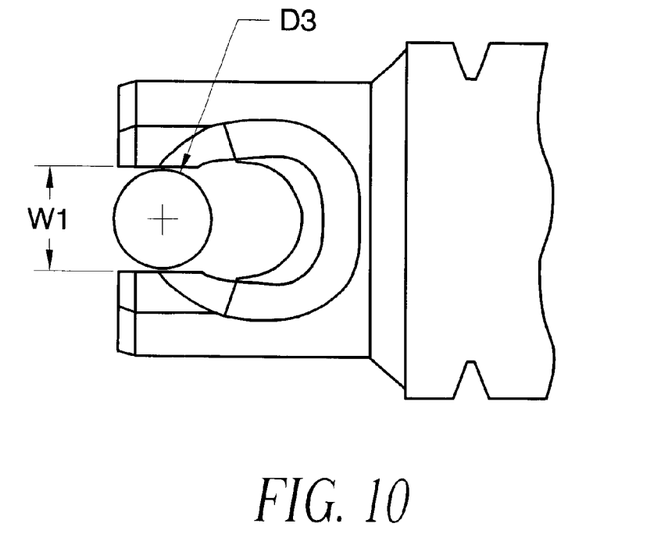
FIGS. 10 and 11 illustrate the width of one slot as greater than the width of an actuating bolt in one region of a bolt but less than the width of the actuating bolt in another region of the bolt.
Figure 11:
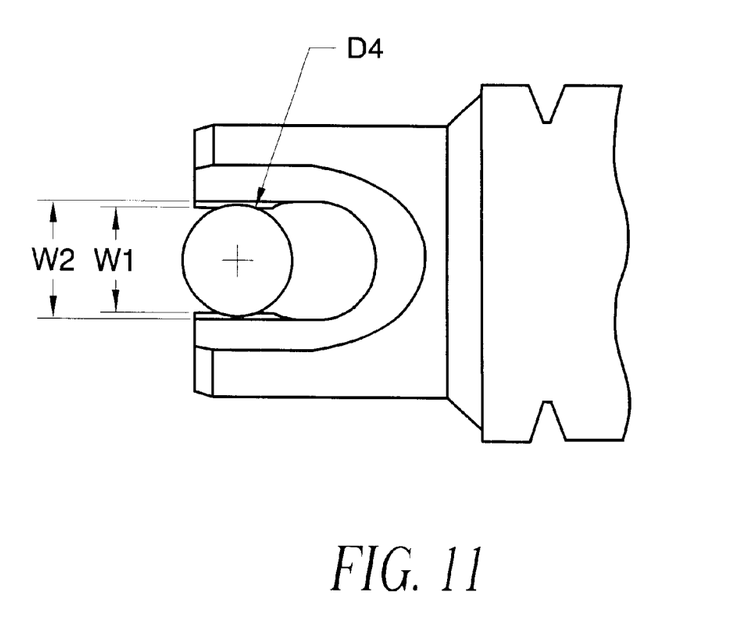

The toolholder 25 is illustrated in FIG. 1 with a pocket 27 to accept a cutting tool. FIG. 9 illustrates an item generally identified in the industry as a toolholder blank 200 in that the tubular shank 30 is attached to a large mass 205 of unmachined material. It is common in the metal working industry to begin with a blank of this sort and to machine the blank into any desirable configuration including an arrangement to accept a cutting tool as illustrated in FIG. 1.

However, the possibility for machining such a blank is unlimited and it is typical to machine such a blank to accept a stationery cutting tool, a rotating cutting tool, or to machine such a blank to act as a coupling for an extension piece or another toolholder. Therefore, it should be understood the subject invention is not limited to a toolholder on the shank but may be expanded to any device for metal working operations which utilizes a shank 30 similar to that illustrated in FIG. 1.

While the shank 30 and the bore 40 of the associated tool support member 15 have been illustrated as tubular, the invention should not be limited to such a shape.

Finally, although this apparatus is ideal for small tools, i.e. toolholders with a width of 1 inch or less, that should not be a limitation upon the use and it should be understood this apparatus would be functional for use with a toolholder of any width. It is thought that the present invention and many of its intended advantages will be understood from the foregoing description and it will be apparent that various changes may be made in the form, construction and arrangement of the parts thereof without departing from the spirit and the scope of the invention or sacrificing all of its material advantages, the form herein before described being merely preferred or exemplary embodiments thereof.

What is claimed is:

1. An apparatus for releasably holding a toolholder, the apparatus comprising:
    a) a tool support member having a forwardly facing surface, a bore along a longitudinal axis and a passageway, wherein the bore intersects the forwardly facing surface and extends rearwardly therefrom for receiving the toolholder and wherein the passageway extends through the tool support member and intersects the longitudinal axis, and;
    b) an actuating bolt extending all the way through the tool support member within the passageway and is reciprocally movable between a locking position and a releasing position along a radial axis relative to the longitudinal axis for locking or ejecting a shank into or from the tool support member, wherein the actuating bolt has a locking segment for abutting and urging rearwardly the locking surface of the shank of the toolholder to lock the toolholder within the tool support member.

2. The apparatus according to claim 1 wherein the passageway defines first and second apertures within the support member with the second aperture diametrically opposed to the first aperture.

3. The apparatus according to claim 2 wherein the bolt is matingly threaded within at least one aperture such that rotation of the bolt within the aperture will move the bolt in a radial direction.

4. The apparatus according to claim 3 wherein the actuating bolt at one end has a head with a cavity compatible with a tool for rotating the actuating bolt.

5. The apparatus according to claim 1 wherein the locking segment is a locking flange disposed toward a first end of the bolt.

6. The apparatus according to claim 5 wherein the locking flange has a locking wedge surface.

7. The apparatus according to claim 6 wherein the locking wedge surface of the locking segment forms an angle with the radial axis (R1) of between 10°–60°.

8. The apparatus according to claim 7 wherein the locking wedge surface of the locking segment forms an angle with the radial axis (R1) of approximately 30°.

9. The apparatus according to claim 6 wherein the locking wedge surface has a conical shape.

10. The apparatus according to claim 9 wherein the conical shape of the locking wedge surface has a centerline which is co-axial with the axis of the bolt.

11. The apparatus of claim 1 wherein the actuating bolt further includes a releasing segment for abutting and urging forwardly a releasable surface of the shank to eject the toolholder shank from the support member.

12. The apparatus according to claim 11 wherein the releasing segment is a releasing flange disposed toward a second end of the bolt.

13. The apparatus according to claim 12 wherein the releasing flange has a releasing wedge surface.

14. The apparatus according to claim 13 wherein the releasing wedge surface of the releasing segment forms an angle with the radial axis (R1) of between 10°–60°.

15. The apparatus according to claim 14 wherein the releasing wedge surface of the releasing segment forms an angle with the radial axis (R1) of approximately 45°.

16. The apparatus according to claim 13 wherein the releasing wedge surface has a conical shape to provide a releasing cone.

17. The apparatus according to claim 16 wherein the conical shape of the releasing wedge surface has a centerline which is offset with respect to the axis of the actuating bolt.

18. The apparatus according to claim 1 wherein the actuating bolt is one integral piece.

19. The apparatus according to claim 2 wherein a locking flange and a releasing flange each have different diameters which are compatible with the diameters of first and second apertures.

20. The apparatus according to claim 1 wherein the actuating bolt has a middle section with two diameters of different sizes to accept opposing slots, each of a different width, on the shank of the toolholder in one orientation.

21. The apertures according to claim 1 wherein the bore of the tool support member is cylindrical to accommodate a cylindrical toolholder shank.

22. An apparatus for releasably holding a shank having a lockable surface and a releasable surface, the apparatus comprising:
   a) a support member having a forwardly facing surface and a bore along a longitudinal axis, wherein the bore intersects the forwardly facing surface and extends rearwardly therefrom for receiving the shank and;
   b) an actuating bolt extending all the way through the support member and reciprocally movable between a locking and a releasing position along a radial axis relative to the longitudinal axis for locking or ejecting the shank into or from the support member, wherein the actuating bolt has a locking segment for abutting and urging rearwardly the lockable surface of the shank to lock the shank within the support member, wherein the actuating bolt is positioned within a passageway which extends through the support member along the radial axis thereby defining first and second apertures within the support member with the second aperture diametrically opposed to the first aperture.

23. A toolholder for mounting in a bore of a tool support member with a longitudinal axis and a forwardly facing surface and for being secured within the bore by an actuating bolt movable in a reciprocating motion along a radial axis, wherein the bolt has a releasing segment and a locking segment, the toolholder comprising:
   a) a forward end upon which a cutting tool is capable of being mounted;
   b) a shank adjacent to and connected to a rearwardly facing abutment face and extending rearwardly away from the forward end; and
   c) wherein the shank is perforated by a lockable perforation and a releasable perforation at two circumferentially spaced locations, wherein the lockable perforation has a lockable surface which is urged rearwardly by the locking segment of the actuating bolt moved along the radial axis in one direction and wherein the releasable perforation has a releasable surface which is urged forwardly by a releasing surface of the actuating bolt moved in an opposite radial direction.

24. The toolholder according to claim 23 wherein the shank has one slot in a region rearwardly of each of the perforations extending to the end of the shank to permit access by the actuating bolt to each of the perforations.

25. The toolholder according to claim 23 wherein the width of one slot is greater than the width of the actuating bolt in one region of the bolt but less than the width of the actuating bolt in another region of the bolt thereby providing an error-proof arrangement for inserting the toolholder shank within the bore at a pre-determined orientation.

26. The toolholder according to claim 23 further including a rearwardly facing abutment face adjacent to and connected to the forward end of the toolholder for abutment with the forwardly facing surface of the tool support member.

27. The toolholder according to claim 23 wherein the lockable surface is a wedge located rearwardly of the actuating bolt centerline.

28. The toolholder according to claim 27 wherein the lockable surface has the shape of a cone.

29. The toolholder according to claim 28 wherein the cone of the lockable surface has a centerline which is coaxial with the centerline of a locking surface of the actuating bolt.

30. The toolholder according to claim 28 wherein the cone of the lockable surface extends partially around to the lockable perforation from a location rearwardly of the actuating bolt centerline.

31. The toolholder according to claim 30 wherein the conical shape of the lockable surface ends partially around to the lockable perforations from a location rearwardly of the radial axis (R2) of the actuating bolt to form with the radial axis (R2) an angle (C) of between 5°–80°.

32. The toolholder according to claim 31 wherein the angle (C) is approximately 50°–60°.

33. The toolholder according to claim 30 wherein the portion of the lockable perforation which is not part of the lockable surface is spaced from a locking surface of the actuating bolt.

34. The toolholder according to claim 23 wherein the releasable surface is a wedge located forwardly of the actuating bolt centerline.

35. The toolholder according to claim 34 wherein the releasable surface has the shape of a cone to provide a releasable cone.

36. The toolholder according to claim 35 wherein the releasable cone has a centerline which is coaxial with the centerline of the releasing surface of the actuating bolt and there is clearance between the releasable perforation of the shank and the releasing surface of the bolt in the region rearwardly of the releasable perforation centerline.

37. The toolholder according to claim 33 wherein the releasable cone has a centerline which is offset with the centerline of the releasing surface of the releasable bolt and there is clearance between the lockable perforation of the shank and the releasing surface of the bolt in the region rearwardly of the releasable perforation centerline.

38. The toolholder according to claim 35 wherein the releasable cone extends partially around and engages the perforation from a location rearwardly of the actuating bolt centerline.

39. The toolholder according to claim 38 wherein the remaining portion of the perforation is spaced from a locking surface of the actuating bolt.

40. The toolholder according to claim 23 wherein the toolholder shank is cylindrical.

41. A toolholder for mounting in a bore of a support member with a longitudinal axis and a forwardly facing surface and for being secured within the bore by an actuating bolt movable in a reciprocating motion along a radial axis, wherein the bolt has a releasing segment and a locking segment, the holder comprising:
   a) a forward end;
   b) a shank adjacent to and connected to the rearwardly facing abutment face and extending rearwardly away from the forward end; and
   c) wherein the shank is perforated by a lockable perforation and a releasable perforation at two circumferentially spaced locations, wherein the lockable perforation has a lockable surface which is urged rearwardly by the locking segment of the actuating bolt moved in a radial direction and wherein the releasable perforation has a releasable surface which is urged forwardly by a releasing surface of the actuating bolt moved in an opposite radial direction.

42. A combination for mounting a toolholder into a bore in a forwardly facing surface of a tool support member, said combination comprising:
   a shank on a rearward portion of the toolholder extending rearwardly into the bore of the tool support member;
   wherein the shank is perforated by a lockable perforation and a releasable perforation at two circumferentially spaced locations;

a lockable surface in the lockable perforation which is capable of being engaged by a locking segment of the actuating bolt to lock the shank within the toolholder;

a releasable surface in the releasable perforation which may be engaged by a releasing surface of the actuating bolt to eject the shank from the toolholder; and an actuating bolt having a locking segment and a releasing segment wherein the actuating bolt is reciprocable between a locked position in which the locking segment of the actuating bolt engages the lockable surface of the shank lockable perforation and a released position in which the releasing segment of the actuating bolt engages the releasable surface of the shank releasable perforation.

43. The combination according to claim 42 wherein the actuating bolt lies along an axis radial to the tool support member longitudinal axis and wherein a locking surface of the actuating bolt engages the lockable surface of the shank in a region rearward of the radial axis.

44. The combination according to claim 42 wherein the actuating bolt lies along an axis radial to the tool support member longitudinal axis and wherein the releasing surface of the actuating bolt engages the releasable surface of the shank in a region forward of the radial axis.

45. The combination according to claim 42 wherein the toolholder shank is tubular and the bore of the tool support member is conformed to accommodate the shank.

* * * * *